(12) United States Patent
Vandergeest et al.

(10) Patent No.: US 11,187,255 B2
(45) Date of Patent: Nov. 30, 2021

(54) WEDGE CLAMP FOR SECURING SAFETY GUARDS AROUND INDUSTRIAL EQUIPMENT

(71) Applicant: Vandergeest Inc., Barrie (CA)

(72) Inventors: Paul Vandergeest, Barrie (CA); Karen Vandergeest, Barrie (CA)

(73) Assignee: Vandergeest Inc., Barrie (CA)

( * ) Notice: Subject to any disclaimer, the term of this patent is extended or adjusted under 35 U.S.C. 154(b) by 319 days.

(21) Appl. No.: 16/415,975

(22) Filed: May 17, 2019

(65) Prior Publication Data
US 2020/0362892 A1    Nov. 19, 2020

(51) Int. Cl.
*F16B 2/14*    (2006.01)

(52) U.S. Cl.
CPC ..................... *F16B 2/14* (2013.01)

(58) Field of Classification Search
CPC ...... F16B 1/02; F16B 2/14; F16B 2/18; F16B 2/26; F16B 5/0024; F16B 5/0084; F16B 5/0088; F16B 5/02; F16B 5/0642; F16B 12/2009; F16B 12/2027; F16B 12/2036; F16B 12/32; F16B 13/0808; F16P 1/00; F16P 1/005; F16P 1/02; Y10T 403/30; Y10T 403/58; Y10T 403/59; Y10T 403/7009; Y10T 403/7015; Y10T 403/7064; Y10T 403/7066; Y10T 403/7147; Y10T 403/75; Y10T 403/76
USPC .......... 411/340, 345, 355; 403/49, 315, 321, 403/350, 353, 374.1, 374.2, 392, 408.1, 403/409.1; 292/DIG. 49
See application file for complete search history.

(56) References Cited

U.S. PATENT DOCUMENTS

| | | | | |
|---|---|---|---|---|
| 325,221 A * | 8/1885 | Wright | ............... | F16B 13/0808 411/342 |
| 965,845 A * | 7/1910 | Ellis | ................... | F16B 13/0808 411/344 |
| 1,346,578 A * | 7/1920 | Windsor | ............ | F16B 13/0808 411/340 |
| 1,402,566 A * | 1/1922 | Buhoup | .................. | F16B 21/10 411/340 |
| 1,505,241 A * | 8/1924 | Berry | ...................... | F16B 21/12 411/345 |
| 1,506,123 A * | 8/1924 | Hubener | ............. | F16B 13/0808 411/103 |

(Continued)

FOREIGN PATENT DOCUMENTS

| | | | | |
|---|---|---|---|---|
| DE | 19837274 A1 * | 2/2000 | ......... | F16B 13/0808 |
| DE | 102006052664 A1 * | 5/2008 | ......... | F16B 13/0808 |

(Continued)

*Primary Examiner* — Josh Skroupa
(74) *Attorney, Agent, or Firm* — Kaplan Breyer Schwarz, LLP (57) ABSTRACT

A device for securing safety guards around machinery includes a portable wedge clamp device which is inserted through both the safety guard and the post. The portable wedge clamp device includes a base wedge member and a cooperating drive wedge member. The bullet-shaped end of the drive wedge member is modified to include a groove around which a cable tie is used to prevent the drive wedge member from rattling and from moving and becoming unlocked. Alternatively, the bullet-shaped end of the drive wedge member includes a slot through which the cable tie is secured.

4 Claims, 13 Drawing Sheets

(56) References Cited

U.S. PATENT DOCUMENTS

| | | | | |
|---|---|---|---|---|
| 1,516,347 A * | 11/1924 | Pataky | | F16B 13/0808 411/340 |
| 1,650,454 A * | 11/1927 | Langan | | F16B 5/0642 411/345 |
| 2,015,376 A * | 9/1935 | Brodhead | | A47H 13/00 411/340 |
| 2,072,066 A * | 2/1937 | Cossentine | | F16B 13/0808 411/344 |
| 2,124,658 A * | 7/1938 | Smith | | F16B 13/0808 411/341 |
| 2,360,395 A * | 10/1944 | Byron | | B67D 3/04 411/340 |
| 2,660,083 A * | 11/1953 | Tyson | | F16B 13/0808 411/396 |
| 3,288,014 A * | 11/1966 | Mortensen | | F16B 13/0808 411/344 |
| 3,476,007 A * | 11/1969 | Collister | | F16B 13/0808 411/345 |
| 3,673,910 A * | 7/1972 | Collister | | F16B 13/0808 411/345 |
| 3,861,267 A * | 1/1975 | Collister | | F16B 13/0808 411/345 |
| 4,167,772 A * | 9/1979 | Baehne | | H05K 7/1417 411/340 |
| 4,199,178 A * | 4/1980 | Coats | | E05B 17/0025 292/205 |
| 4,430,019 A * | 2/1984 | D'Alessio | | E04G 7/26 403/49 |
| 4,508,479 A * | 4/1985 | Mez | | F16B 2/14 411/340 |
| 4,822,197 A * | 4/1989 | DeMartino | | F16B 21/10 411/340 |
| 5,112,155 A * | 5/1992 | Jackson | | E04G 7/305 403/49 |
| 5,437,515 A * | 8/1995 | Kuramoto | | F16B 21/165 411/340 |
| 5,507,611 A * | 4/1996 | Collister | | F16B 13/0808 411/340 |
| 5,630,711 A * | 5/1997 | Luedtke | | F16B 13/0808 417/477.1 |
| 5,774,951 A * | 7/1998 | Close | | F16B 2/14 198/836.1 |
| 5,803,688 A * | 9/1998 | Gleason | | F16B 13/0808 411/345 |
| 6,062,341 A * | 5/2000 | Frank | | E04G 5/00 403/49 |
| 6,685,408 B1 * | 2/2004 | Fusco | | F16B 13/0808 411/340 |
| 7,878,463 B2 * | 2/2011 | Kauppila | | F16J 15/3268 248/65 |
| 7,887,105 B2 * | 2/2011 | Anastasiadis | | E05C 19/188 411/340 |
| 8,985,877 B1 * | 3/2015 | Brewer | | F16B 2/18 396/419 |
| 9,568,032 B2 | 2/2017 | Vandergeest et al. | | |
| 10,267,349 B2 * | 4/2019 | Apostolopoulos | | F16B 13/0808 |
| 2008/0048459 A1 * | 2/2008 | Fang | | F16B 21/12 292/252 |
| 2009/0053007 A1 * | 2/2009 | Rafaeli | | F16B 13/0808 411/344 |

FOREIGN PATENT DOCUMENTS

| | | | | |
|---|---|---|---|---|
| DE | 102012214682 A1 * | 10/2013 | | F16B 12/2036 |
| GB | 554416 A * | 7/1943 | | F16B 13/0808 |
| GB | 838435 A * | 6/1960 | | F16B 13/0808 |

\* cited by examiner

WEDGE CLAMP FOR SECURING SAFETY GUARDS AROUND INDUSTRIAL EQUIPMENT

FIELD OF THE INVENTION

This invention relates to a device for securing safety guards around mining and industrial equipment.

BACKGROUND OF THE INVENTION

Safety Guards are used to keep workers safe from mining and industrial equipment when they are in operation. These safety guards must be kept closed and locked and, by most provincial and state laws, must be locked in such a manner that a tool is required to remove the locking means.

The requirement for a tool to remove the safety guard was enacted to force the worker who is required to work on the equipment behind the safety guard to make an additional effort to remove the safety guard. This additional effort will make the worker think about the hazard that is behind the guard and use a safe practice when servicing the area.

When the safety guard is locked using hardware, such as nuts and bolts, the worker must remove the nuts and bolts completely in order to gain access to the industrial equipment. There is a risk that the nuts and bolts will fall and become caught in the industrial equipment. If the nuts and bolts fall and become lost, there is a risk that worker might not properly secure the safety guard. Further, if the safety guard is located a significant distance above the ground, losing nuts and bolts can be inconvenient.

U.S. Pat. No. 9,568,032 describes a portable locking wedge clamp device which is inserted through both the safety guard and the post. The portable wedge clamp device includes a base wedge member and a corresponding drive wedge member. A set screw is used to prevent the drive wedge member from moving and becoming unlocked.

Another way of securing the safety guard is to use a wedge clamp with a cable tie wrapped around the opening of the wedge to ensure compliance with the requirement that a tool, such as side cutters or a knife, be used to open the wedge clamp. The disadvantage of this system is that, although the cable tie prevents the wedge clamp from opening to any dangerous degree, it does not force the wedge into the closed position. As a result, the wedge is somewhat loose and can rattle.

It would be advantageous to have a better system for closing the wedge clamp which forces the wedge into the closed position such that it remains firmly closed.

SUMMARY OF THE INVENTION

According to one embodiment of the invention, there is described a wedge clamp device in which the bullet shaped end of the wedge is modified to include a groove that allows a cable tie to be wrapped tightly around the outside of the bullet shaped end and the first arm of the wedge clamp, forcing it into a closed and secured position and keeping the wedge clamp firmly closed.

According to a second embodiment of the invention, the bullet shaped end of the wedge is modified to include a slot through which the cable tie is wrapped around the first arm, forcing it into a closed and secured position and keeping the wedge clamp firmly closed.

BRIEF DESCRIPTION OF THE DRAWINGS

Embodiments of the invention will now be described by reference to the following drawings in which.

DETAILED DESCRIPTION

First Embodiment

Figure 1:
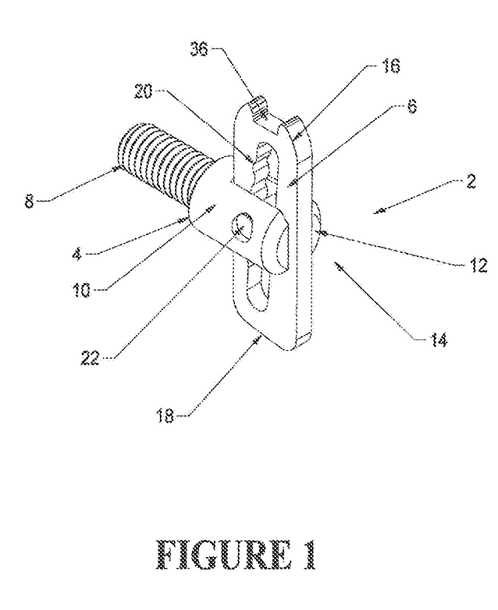
FIG. 1 is a perspective view of the wedge clamp in closed position.

Referring to FIG. 1, there is shown a portable wedge clamp device 2 comprising a base wedge member 4 and a cooperating drive wedge member 6 in closed position.

The base wedge member 4 has a threaded end 8 and a first arm 10 and second arm 12 forming a generally U-shape at an opposite shaft end 14.

The cooperating drive wedge member 6 has a bullet-shaped end 16 and a blunt end 18 defining a central channel having a plurality of notches 20. The bullet shaped end 16 includes a horizontal groove 36 of sufficient width to snugly accommodate a tie wrap (not shown).

A pin 22 extends through the first arm 10 and second arm 12 and engages the notches 20.

In this closed position, the cooperating drive wedge member 6 is substantially perpendicular to the base wedge member 4.

Figure 2:
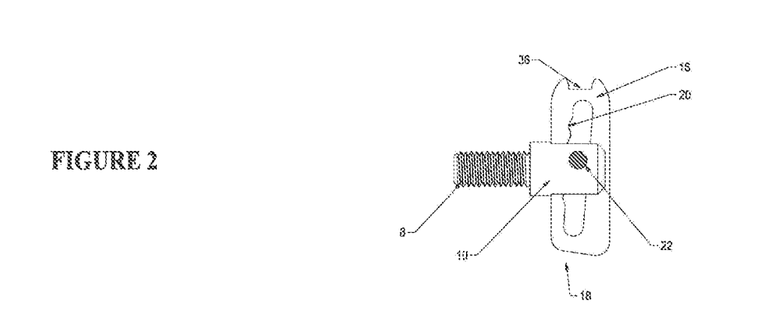
FIG. 2 is a front view of the wedge clamp in closed position.
Figure 3:
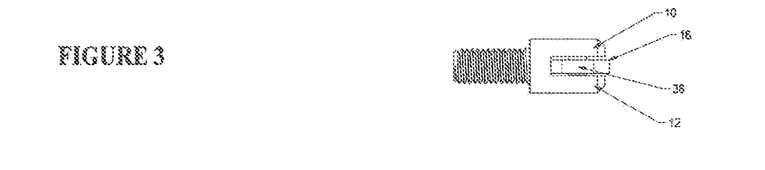
FIG. 3 is a top view of the wedge clamp in closed position.
Figure 4:
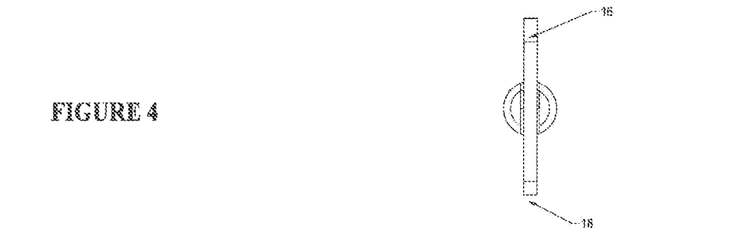
FIG. 4 is a right side view of the wedge clamp in closed position.
Figure 5:
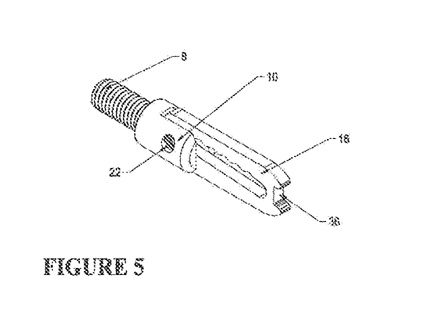
FIG. 5 is a perspective view of the wedge clamp in open position.
Figure 6:
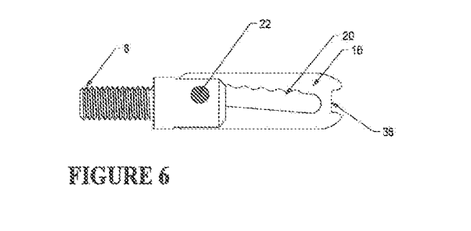
FIG. 6 is a front view of the wedge clamp in open position.
Figure 7:
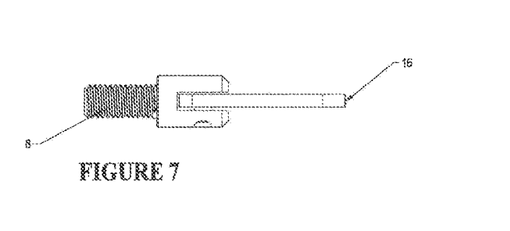
FIG. 7 is a top view of the wedge clamp in open position.
Figure 8:
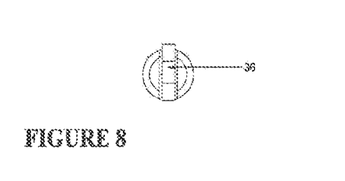
FIG. 8 is a right side view of the wedge clamp in open position.
Figure 9:
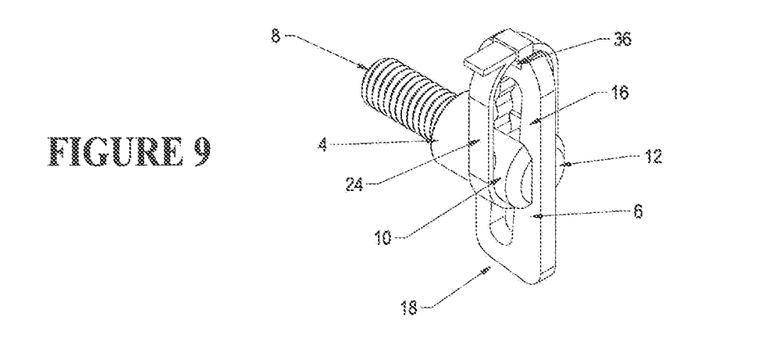
FIG. 9 is a perspective view of the wedge clamp in closed position and including a tie wrap.
Figure 10:
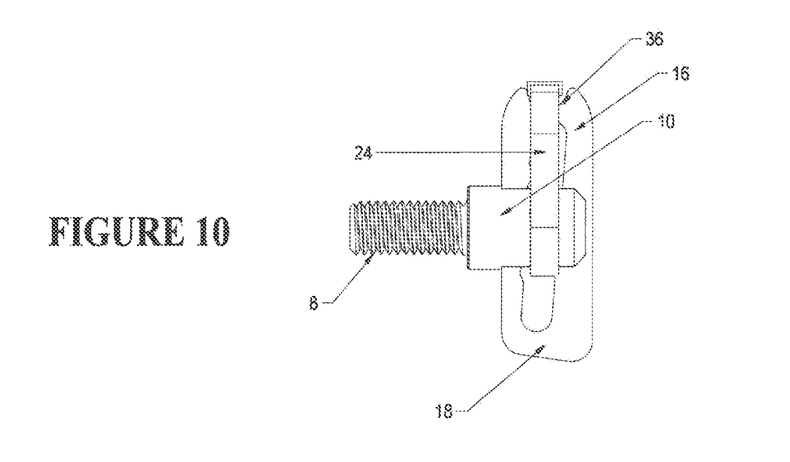
FIG. 10 is a front view of the wedge clamp in closed position and including a tie wrap.
Figure 11:
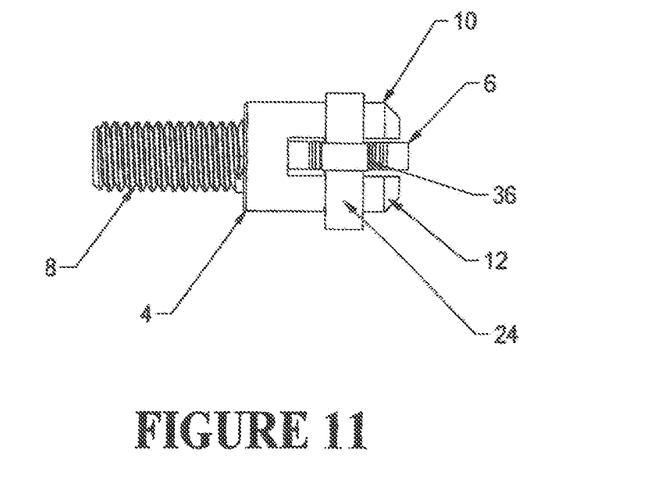
FIG. 11 is a top view of the wedge clamp in closed position and including a tie wrap.
Figure 12:
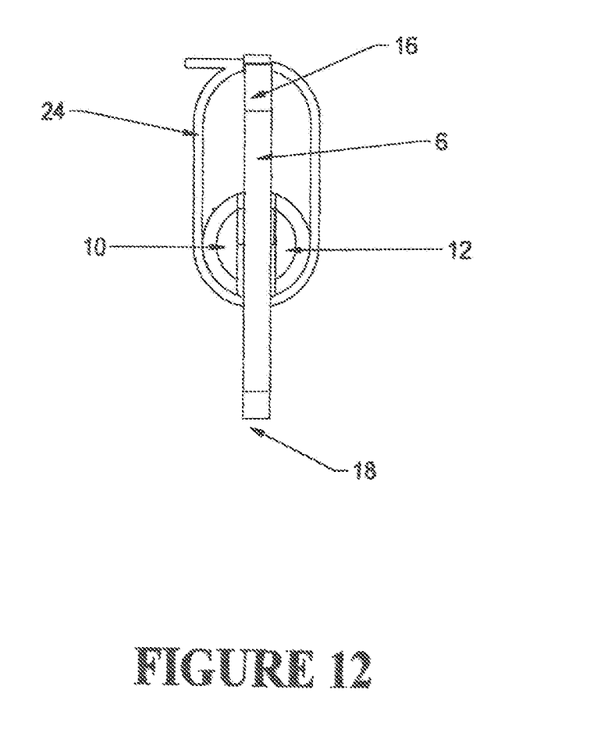
FIG. 12 is a right side view of the wedge clamp in closed position and including a tie wrap.

Referring to FIGS. 2 to 4, the portable wedge clamp device 2 is shown in more detail.

Referring to FIGS. 5 to 8, the portable wedge clamp device 2 is shown in its open position. The drive wedge member 6 is oriented substantially in line with the base wedge member 4.

Referring to FIGS. 9 to 12, the wedge clamp device 2 is shown in closed position. A tie wrap 24 is shown wrapped through the central channel below the first arm 10 and second arm 12 of the base wedge member 4 and over the bullet shaped end 16 of the cooperating drive wedge member 6 through the groove 36 such that the tie wrap 24 rests snugly in the groove 36 and has been tightened, thereby preventing the drive wedge member 6 from returning to its initial open position oriented substantially in line with the base wedge member 4.

Figure 13:
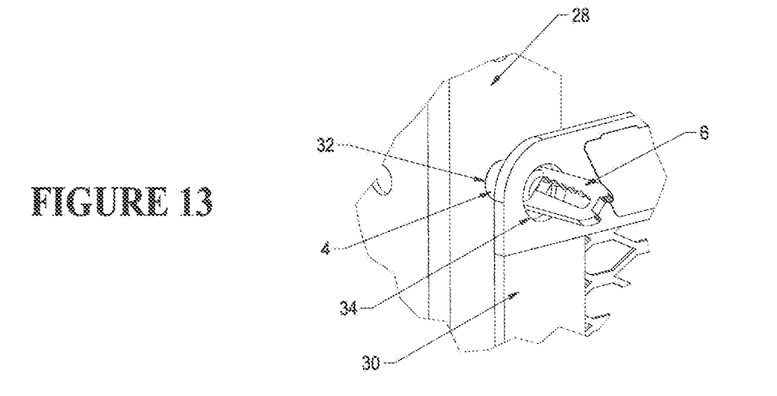
FIG. 13 is a perspective view of the post and safety guard showing the wedge clamp in open position.

Referring to FIG. 13, in use, the portable wedge clamp device 2 is shown in its open or unlocked position where the drive wedge member 6 is oriented substantially in line with the base wedge member 4. The drive wedge member 6 has been inserted through a hole 32 in a post 28 and through a corresponding hole 34 in a safety guard 30.

Once the drive wedge member 6 has been completely inserted through the hole 34 in the safety guard 30, the portable wedge clamp device 2 is ready to be placed in the closed position and locked.

Figure 14:
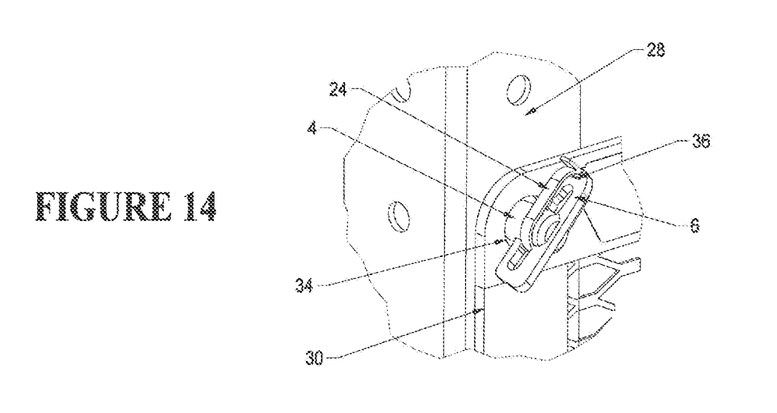
FIG. 14 is a perspective view of the post and safety guard showing the wedge clamp in closed position and tie wrap.

Referring to FIG. 14, the drive wedge member 6 is rotated so that it is substantially perpendicular to the base wedge member 4. A tie wrap 24 is then wrapped through the central channel below the first arm 10 and second arm 12 of the base wedge member 4 and over the bullet shaped end 16 of the cooperating drive wedge member 6 through the groove 36 such that the tie wrap 24 rests snugly in the groove 36 and has been tightened, thereby preventing the drive wedge member 6 from returning to its initial open position oriented substantially in line with the base wedge member 4. In this manner, the drive wedge member 6 is now locked.

Second Embodiment

Figure 15:
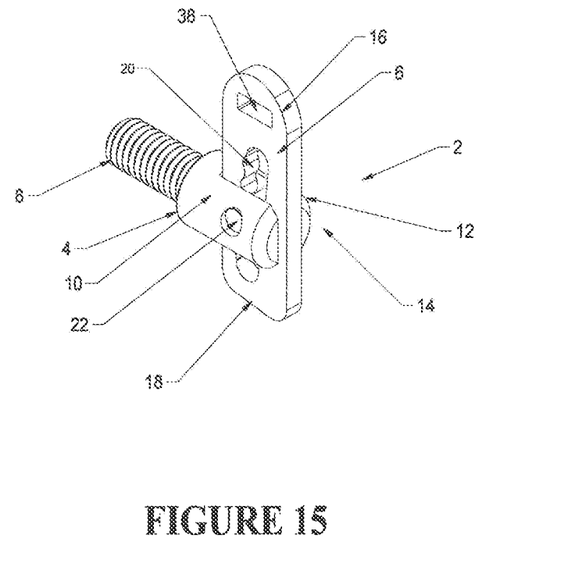
FIG. 15 is a perspective view of the wedge clamp in closed position according to a second embodiment of the invention.

Referring to FIG. 15, there is shown a second embodiment of the invention where the bullet shaped end 16 of the drive wedge member 6 includes a slot 38 of sufficient width to snugly accommodate a tie wrap.

Figure 16:
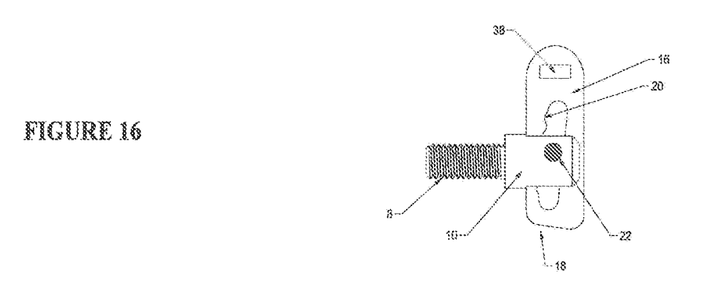
FIG. 16 is a front view of the wedge clamp in closed position according to the second embodiment of the invention.
Figure 17:
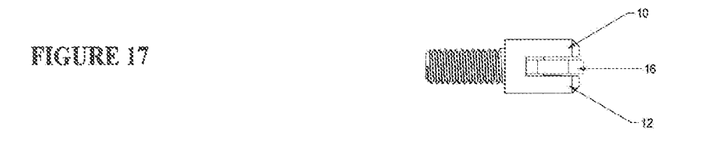
FIG. 17 is a top view of the wedge clamp in closed position according to the second embodiment of the invention.
Figure 18:
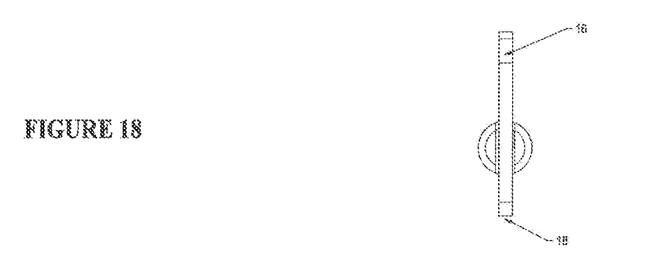
FIG. 18 is a right side view of the wedge clamp in closed position according to the second embodiment of the invention.
Figure 19:
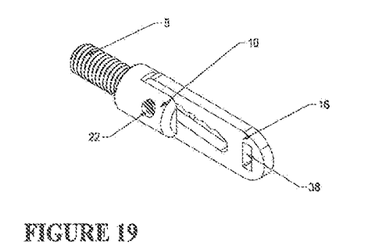
FIG. 19 is a perspective view of the wedge clamp in open position according to the second embodiment of the invention.
Figure 20:
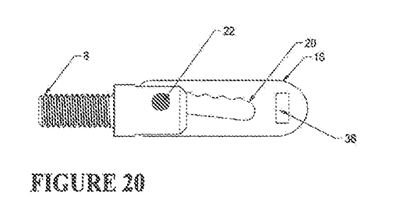
FIG. 20 is a front view of the wedge clamp in open position according to the second embodiment of the invention.
Figure 21:
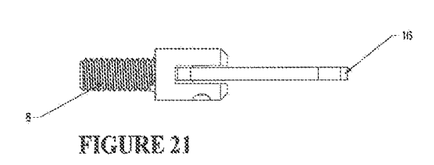
FIG. 21 is a top view of the wedge clamp in open position according to the second embodiment of the invention.
Figure 22:
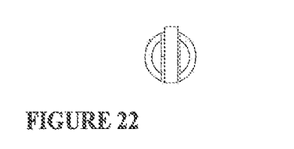
FIG. 22 is a right side view of the wedge clamp in open position according to the second embodiment of the invention.
Figure 23:
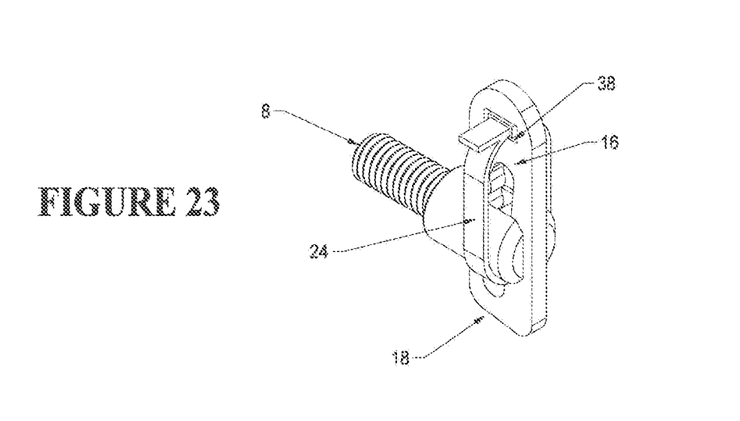
FIG. 23 is a perspective view of the wedge clamp in closed position and tie wrap according to the second embodiment of the invention.
Figure 24:
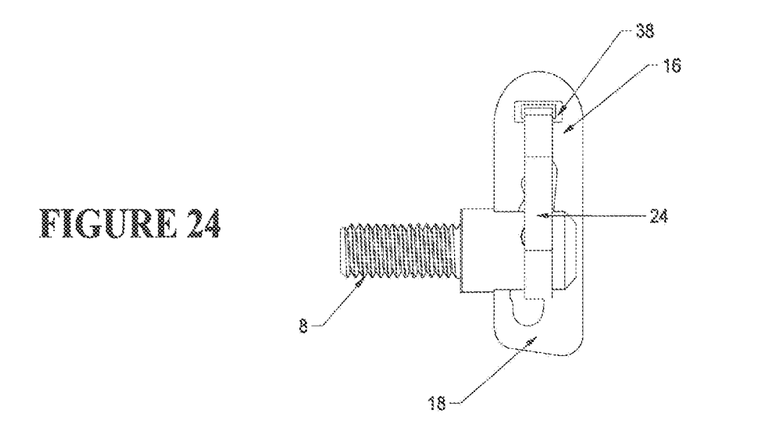
FIG. 24 is a front view of the wedge clamp in closed position and tie wrap according to the second embodiment of the invention.
Figure 25:
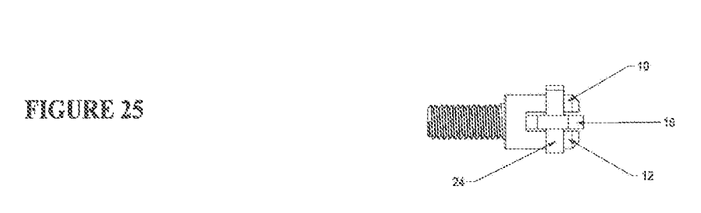
FIG. 25 is a top view of the wedge clamp in closed position and tie wrap.
Figure 26:
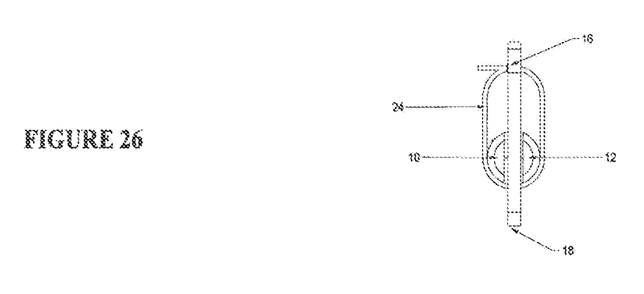
FIG. 26 is a right side view of the wedge clamp in closed position and tie wrap according to the second embodiment of the invention.

Referring to FIGS. 16 to 18, the second embodiment of the portable wedge clamp device 2 is shown in more detail.

Referring to FIGS. 19 to 22, the second embodiment of the portable wedge clamp device 2 is shown in its open and unlocked position.

Referring to FIGS. 23 to 26, in the second embodiment of the portable wedge clamp device 2, the tie wrap 24 is wrapped through the central channel below the first arm 10 and second arm 12 of the base wedge member 4 and through the slot 38 in the bullet shaped end 16 of the cooperating drive wedge member and is pulled tight thereby preventing the drive wedge member 6 from returning to its initial open position oriented substantially in line with the base wedge member 4.

Figure 27:
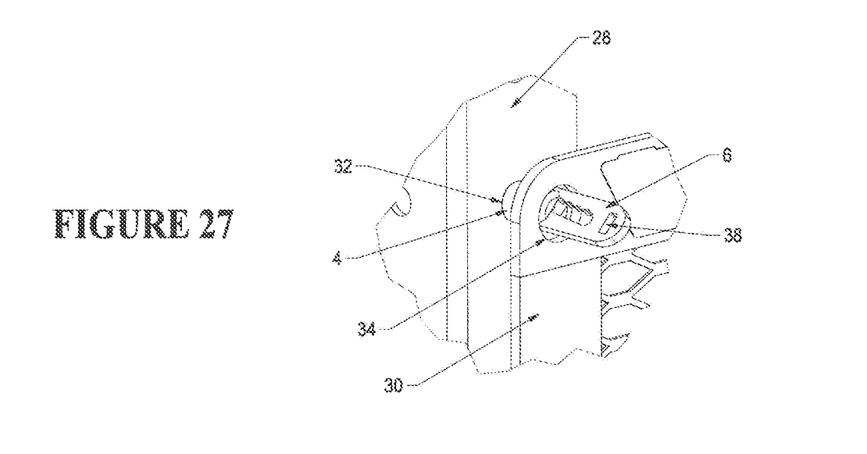
FIG. 27 is a perspective view of the post and safety guard showing the wedge clamp in open position according to the second embodiment of the invention.
Figure 28:
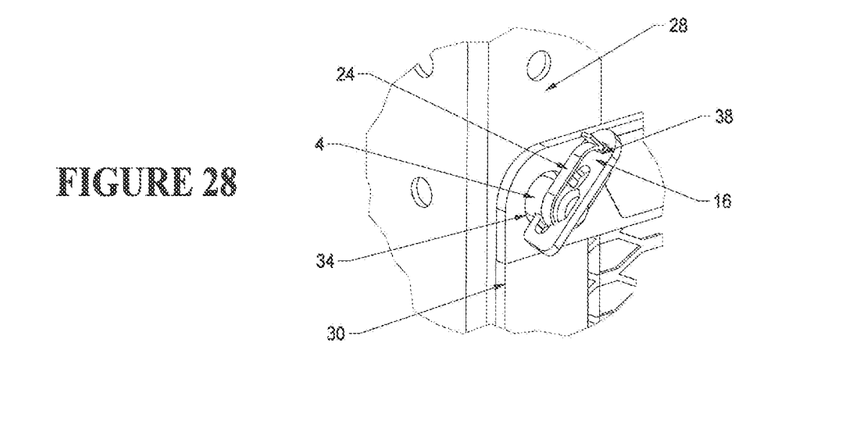
FIG. 28 is a perspective view of the post and safety guard showing the wedge clamp in closed position and tie wrap according to the second embodiment of the invention.

As shown in FIGS. 27 and 28, in use the second embodiment of the portable wedge clamp device 2 is used to fasten a safety guard 30 to a post 28.

Referring to FIG. 27, the second embodiment of the portable wedge clamp device 2 is shown in its open or unlocked position where the drive wedge member 6 is oriented substantially in line with the base wedge member 4 and both are inserted through a hole 32 in the post 28 and through a corresponding hole 34 in the safety guard 30.

Once the drive wedge member has been completely inserted through the hole 34 in the safety guard 30, the portable wedge clamp device 2 is ready to be placed in the closed position and locked.

Referring to FIG. 28, using the second embodiment of the portable wedge clamp device 2, the drive wedge member 6 is rotated so that it is substantially perpendicular to the base wedge member 4. The tie wrap 24 is then applied and tightened to secure the drive wedge member 6 in place.

The scope of the claims should not be limited by the preferred embodiments set forth in the examples, but should be given the broadest interpretation consistent with the description as a whole. As such, it will thus be seen that the objects set forth above, among those made apparent from the preceding description, are efficiently attained, and, since numerous/certain changes may be made in the above constructions without departing from the spirit and scope of the invention, it is intended that all matter contained in the above description and shown in the accompanying drawings shall only be interpreted as illustrative and not in a limiting sense.

It is also to be understood that the following claims are intended to cover all of the generic and specific features of the invention herein described, and all statements of the scope of the invention which, as a matter of language, might be said to fall therebetween.

LIST OF REFERENCE NUMERALS 2 wedge clamp
4 base wedge member
6 drive wedge member
8 threaded end
10 arm (first)
12 arm (second)
14 shaft end
16 bullet-shaped end
18 blunt end
20 notches
22 pin
24 tie wrap
26 (not used)
28 post
30 safety guard
32 hole
34 hole 36 groove
38 slot

The invention claimed is:

1. A wedge clamp comprising:
a base wedge member; and
a cooperating drive wedge member;
wherein said base wedge member further comprising a threaded end, a shaft end, a first arm and a second arm, wherein said first and second arms extend from said shaft end;
wherein said drive wedge member is moveable between an initial open or unlocked position and a closed or locked position;
wherein when said drive wedge member is in an open or unlocked position, said drive member is oriented substantially in line with said base wedge member;
wherein when said drive wedge member is in a closed or locked position, said drive wedge member is substantially perpendicular to said base wedge member;
wherein said drive wedge member further comprising a substantially rounded bullet-shaped end and a blunt end further defining a central channel having at least one notch;
wherein a pin extends through said first arm thereby engaging said at least one notch;
wherein the bullet-shaped end includes a horizontal groove along its end; and
wherein a tie wrap is passed through said central channel and into said horizontal groove of said bullet-shaped end, and tightened to prevent said drive wedge member from being moved to said initial open or unlocked position.

2. The wedge clamp according claim 1, wherein said pin extends through said first arm and said second arm thereby engaging said at least one notch.

3. A wedge clamp comprising:
a base wedge member; and
a cooperating drive wedge member;
wherein said base wedge member further comprises a threaded end, a shaft end, a first arm and a second arm, wherein said first and second arms extend from said shaft end;
wherein said drive wedge member is moveable between an initial open or unlocked position and a closed or locked position;
wherein when said drive wedge member is in an open or unlocked position, said drive member is oriented substantially in line with said base wedge member;
wherein when said drive wedge member is in a closed or locked position, said drive wedge member is substantially perpendicular to said base wedge member;
wherein said drive wedge member further comprises a substantially rounded bullet-shaped end and a blunt end further defining a central channel having at least one notch;
wherein a pin extends through said first arm thereby engaging said at least one notch;
wherein the bullet shaped end includes a slot; and
wherein a tie wrap is passed through said central channel and through the slot in the bullet shaped end and tightened to prevent said drive wedge member from being moved to said initial open or unlocked position.

4. The wedge clamp according claim 3, wherein said pin extends through said first arm and said second arm thereby engaging said at least one notch.

* * * * *